(12) United States Patent
Ariyoshi

(10) Patent No.: US 10,160,446 B2
(45) Date of Patent: Dec. 25, 2018

(54) DEVICE AND METHOD FOR CONTROLLING MOTOR OUTPUT OF A HYBRID VEHICLE

(71) Applicant: Nissan Motor Co., Ltd., Yokohama-shi, Kanagawa (JP)

(72) Inventor: Tomohiro Ariyoshi, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 15/533,555

(22) PCT Filed: Dec. 8, 2014

(86) PCT No.: PCT/JP2014/082354
§ 371 (c)(1),
(2) Date: Jun. 6, 2017

(87) PCT Pub. No.: WO2016/092602
PCT Pub. Date: Jun. 16, 2016

(65) Prior Publication Data
US 2017/0334436 A1 Nov. 23, 2017

(51) Int. Cl.
*B60W 20/40* (2016.01)
*B60K 6/543* (2007.10)
(Continued)

(52) U.S. Cl.
CPC ............. *B60W 20/40* (2013.01); *B60K 6/387* (2013.01); *B60K 6/543* (2013.01); *B60W 10/06* (2013.01); *B60W 10/08* (2013.01); *B60W 20/12* (2016.01); *B60W 20/13* (2016.01); *B60W 30/146* (2013.01); *B60W 40/1005* (2013.01); *B60K 2006/4825* (2013.01); *B60W 2510/244* (2013.01); *B60W 2520/10* (2013.01); *B60W 2520/105* (2013.01); *B60W 2530/16* (2013.01);
(Continued)

(58) Field of Classification Search
CPC ...... B60W 20/40; B60W 20/13; B60W 10/06; B60W 10/08; B60W 2510/244; B60W 2540/10; B60W 2550/148; B60W 2710/08
USPC .......................................................... 701/22
See application file for complete search history.

(56) References Cited

U.S. PATENT DOCUMENTS

| 6,532,407 | B1 | 3/2003 | Fuhrer et al. |
| 2003/0088355 | A1 | 5/2003 | Fuhrer et al. |
| 2015/0039167 | A1 | 2/2015 | Ideshio et al. |

FOREIGN PATENT DOCUMENTS

| JP | 2000197214 A | 7/2000 |
| JP | 2002521272 A | 7/2002 |

(Continued)

*Primary Examiner* — Richard A Goldman
(74) *Attorney, Agent, or Firm* — Young Basile Hanlon & MacFarlane, P.C.

(57) ABSTRACT

A hybrid vehicle control device for controlling a hybrid vehicle with an engine and an electric motor as drive sources of the vehicle includes a high-load road travel determination unit configured to determine whether or not the vehicle is traveling on a high running resistance road surface on which a predetermined vehicle acceleration is unobtainable only by an output of the engine, and a motor output setting unit configured to set an output of the electric motor. If the vehicle is determined to be traveling on the high running resistance road surface by the high-load road travel determination unit, the motor output setting unit limits the output of the electric motor when a vehicle speed reaches a predetermined vehicle speed.

8 Claims, 8 Drawing Sheets

(51) Int. Cl.
  *B60W 10/08*  (2006.01)
  *B60W 20/13*  (2016.01)
  *B60W 10/06*  (2006.01)
  *B60K 6/387*  (2007.10)
  *B60W 30/14*  (2006.01)
  *B60W 40/10*  (2012.01)
  *B60W 20/12*  (2016.01)
  *B60K 6/48*  (2007.10)

(52) U.S. Cl.
  CPC ... *B60W 2540/10* (2013.01); *B60W 2550/141* (2013.01); *B60W 2550/148* (2013.01); *B60W 2710/08* (2013.01); *B60W 2710/086* (2013.01); *B60W 2710/087* (2013.01); *B60W 2720/10* (2013.01); *Y02T 10/6221* (2013.01); *Y02T 10/7258* (2013.01); *Y10S 903/906* (2013.01)

(56) References Cited

FOREIGN PATENT DOCUMENTS

| | | |
|---|---|---|
| JP | 2004175356 A | 6/2004 |
| JP | 2007202222 A | 8/2007 |
| JP | 2008162563 A | 7/2008 |
| JP | 2011157038 A | 8/2011 |
| JP | 2013165609 A | 8/2013 |
| WO | 2013084333 A1 | 6/2013 |
| WO | 2014090820 A1 | 6/2014 |

DEVICE AND METHOD FOR CONTROLLING MOTOR OUTPUT OF A HYBRID VEHICLE

TECHNICAL FIELD

The present invention relates to control of a hybrid vehicle with an engine and an electric motor as drive sources.

BACKGROUND ART

JP2007-202222A describes, as control of a hybrid vehicle, a control of limiting an output of an electric motor if a temperature of the electric motor exceeds a predetermined temperature in a state where the vehicle is traveling on a road surface having a larger rolling resistance than on pavement surfaces, such as traveling on sand. This control aims to satisfy travel performance while preventing overheating of the electric motor.

SUMMARY OF INVENTION

In the control of the above document, whether or not to limit the output of the electric motor is judged on the basis of the temperature of the electric motor. Thus, for example, even in a situation where the rolling resistance is large to the extent that a predetermined vehicle acceleration cannot be obtained only by an output of an engine, the output of the electric motor is not limited unless the electric motor is overheated. This causes the output of the electric motor to be continued so as to satisfy the request of a driver.

As the rolling resistance increases, the output necessary for traveling increases and the amount of power consumption increases. Thus, if the electric motor continues to output so as to satisfy the request of the driver in a situation where the rolling resistance is large as described above, there is a possibility that a reduction of the battery charge amount is spurred and assistance by the electric motor cannot be performed.

Accordingly, the present invention aims to suppress reduction of a battery charge amount while performing assistance by an electric motor in a situation where a rolling resistance is large such as on sand.

According to one embodiment of the present invention, a hybrid vehicle control device for controlling a hybrid vehicle with an engine and an electric motor as the drive sources of the vehicle. The control device for controlling a hybrid vehicle includes a high-load road travel determination unit configured to determine whether or not the vehicle is traveling on a high rolling resistance road surface, a predetermined vehicle acceleration being unobtainable on the high rolling resistance road surface by an output of the engine alone; and a motor output setting unit configured to limit an output of the electric motor when a vehicle speed reaches a predetermined vehicle speed in the case of traveling on the high rolling resistance road surface.

DESCRIPTION OF EMBODIMENT

Hereinafter, an embodiment of the present invention is described with reference to the accompanying drawings.

Figure 1:
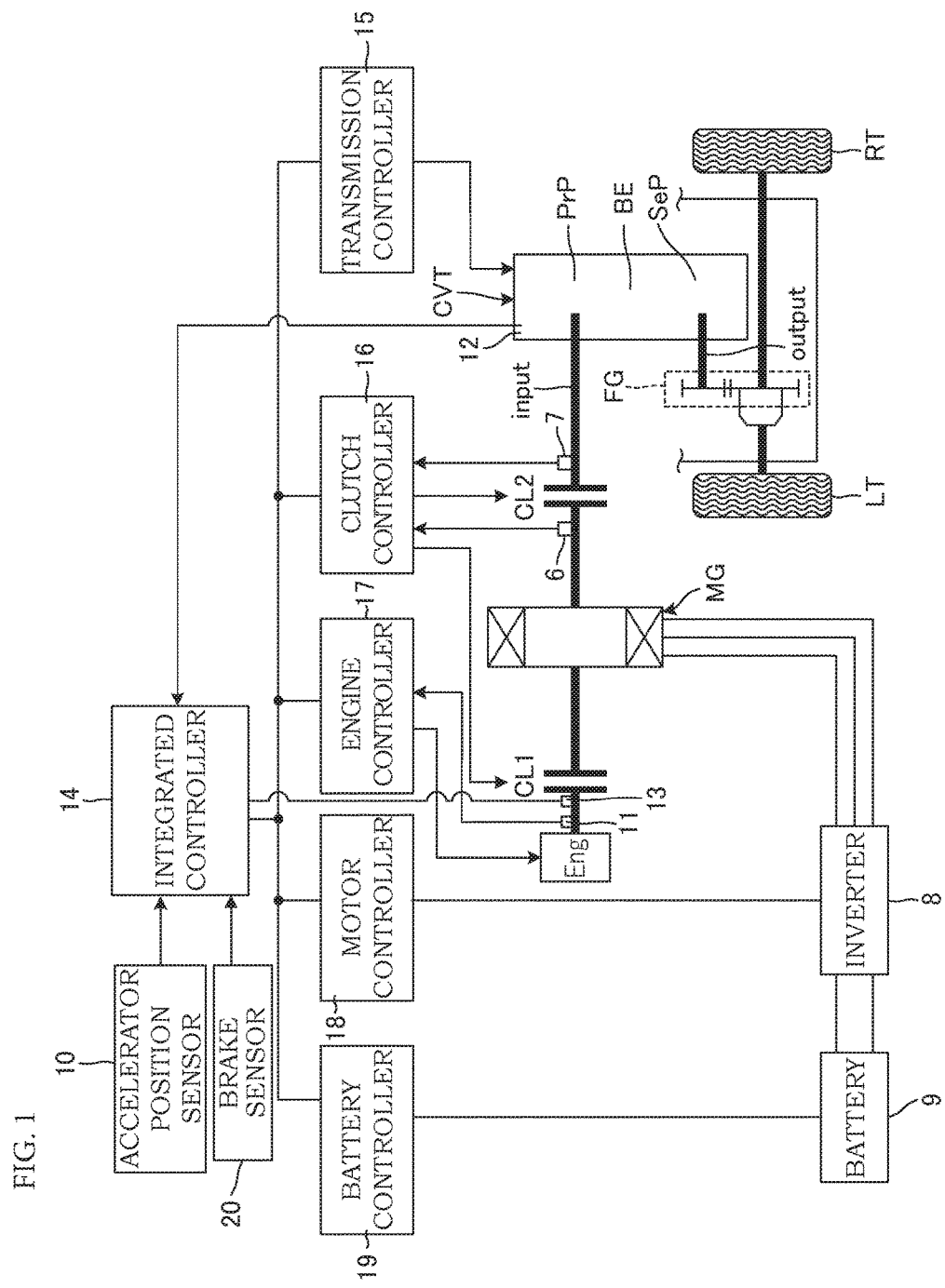
FIG. 1 is an overall system diagram of a hybrid vehicle.

FIG. 1 is an overall system diagram showing a parallel hybrid vehicle (an example of a hybrid vehicle) to which a hybrid vehicle control device of the present embodiment is applied. The configurations of a drive system and a control system are described below on the basis of FIG. 1.

As shown in FIG. 1, the drive system of the parallel hybrid vehicle includes a first clutch CL1, a motor/generator (electric motor) MG, a second clutch CL2, a continuously variable transmission CVT, a final gear FG, a left drive wheel LT and a right drive wheel RT.

The control system of the hybrid vehicle has travel modes such as an electric vehicle travel mode (hereinafter, referred to as an "EV mode"), a hybrid vehicle travel mode (hereinafter, referred to as an "HEV mode"), a quasi-electric vehicle travel mode (hereinafter, referred to as a "quasi-EV mode") and a "WSC (Wet Start Clutch) mode.

The "EV mode" is a mode in which the vehicle travels using only the power of the motor/generator MG with the first clutch CL1 released. The "HEV mode" is a mode in which the vehicle travels in any one of a motor assisted travel mode, a travel power generation mode and an engine travel mode with the first clutch CL1 engaged. The "quasi-EV mode" is a mode in which the vehicle travels using only the power of the motor/generator MG with the first clutch CL1 engaged, but with the engine Eng turned off. The "WSC mode" is a mode in which a slip state of the second clutch CL2 is maintained by controlling a rotation speed of the motor/generator MG at times such as shifting from P, N to D from the "HEV mode" and selecting a D range from the "EV mode" or "HEV mode." WSC mode starts the vehicle while controlling a clutch torque capacity such that a clutch transmission torque passing through the second clutch CL2 reaches a required drive torque determined according to a vehicle state and driver operation.

The engine Eng is controlled such that engine torque matches a command value by controlling an air intake amount by a throttle actuator, a fuel injection amount by an injector and an ignition timing by an ignition plug.

The first clutch CL1 is interposed between the engine Eng and the motor/generator MG. A dry clutch normally closed by a biasing force by a diaphragm spring is, for example, used as this first clutch CL1, and is engaged, half-engaged or released between the engine Eng and the motor/generator MG. A motor torque and an engine torque are transmitted to the second clutch CL2 if this first clutch CL1 is in a completely engaged state, and only the motor torque is transmitted to the second clutch CL2 if the first clutch CL1 is in the released state. It should be noted that a half-engagement/release control is executed by a stroke control for a hydraulic actuator.

The motor/generator MG has an alternating-current synchronous motor structure, executes a drive torque control and a rotation speed control at startup and during traveling and recovers vehicle kinetic energy to a battery 9 by a regeneration brake control during braking and during deceleration.

The second clutch CL2 is a normally open wet multi-disc clutch or wet multi-disc brake and generates a transmission torque (clutch torque capacity) according to a clutch hydraulic pressure (pressing force). This second clutch CL2 transmits torque output from the engine Eng and the motor/generator MG (when the first clutch CL1 is engaged) to the left and right drive wheels LT, RT via the continuously variable transmission CVT and the final gear FG.

It should be noted that an independent clutch may be set as the second clutch CL2 between the continuously variable transmission CVT and the left and right drive wheels LT, RT besides being set between the motor/generator MG and the continuously variable transmission CVT as shown in FIG. 1.

The continuously variable transmission CVT is a V-belt continuously variable transmission including a primary pulley PrP connected to a transmission input shaft "input," a secondary pulley SeP connected to a transmission output shaft "output" and a pulley belt BE mounted between the primary pulley PrP and the secondary pulley SeP.

The primary pulley PrP includes a fixed sheave fixed to the transmission input shaft "input" and a movable sheave slidably supported on the transmission input shaft "input." The secondary pulley SeP includes a fixed sheave fixed to the transmission output shaft "output" and a movable sheave slidably supported on the transmission output shaft "output."

The pulley belt BE is a metal belt wound in between the primary pulley PrP and the secondary pulley SeP, and sandwiched between each fixed sheave and each movable sheave. Here, a so-called VDT-type belt is used which is configured by overlapping a multitude of elements each having inclined surfaces to be respectively brought into contact with the fixed sheave and the movable sheave on both sides, overlapping a thin plate in a laminar manner, and disposing two sets of rings formed into a circular annular shape at both sides of the elements.

When pulley widths of the both pulleys PrP and SeP are changed, a diameter of a portion where the pulley belt BE and the inclined surfaces contact each other changes. A speed ratio (pulley ratio) is freely controlled using this characteristic. Here, if the pulley width of the primary pulley PrP is increased and the pulley width of the secondary pulley SeP is reduced, the speed ratio changes to the Low side. Further, if the pulley width of the primary pulley PrP is reduced and the pulley width of the secondary pulley SeP is increased, the speed ratio changes to the High side.

As shown in FIG. 1, the control system of the parallel hybrid vehicle includes a second clutch input rotation speed sensor 6, a second clutch output rotation speed sensor 7, an inverter 8, a battery 9, an accelerator position sensor 10, an engine revolution speed sensor 11, an oil temperature sensor 12, a stroke position sensor 13, an integrated controller 14, a transmission controller 15, a clutch controller 16, an engine controller 17, a motor controller 18, a battery controller 19, a brake sensor 20 and the like.

The inverter 8 performs direct current/alternating current conversion to generate a drive current for the motor/generator MG. The battery 9 accumulates regenerative energy from the motor/generator MG via the inverter 8.

The integrated controller 14 calculates a target drive torque from a battery state, an accelerator pedal opening, a vehicle speed (value synchronized with the transmission output rotation speed), a hydraulic oil temperature and the like. Then, the integrated controller 14 calculates a command value to each actuator (motor/generator MG, engine Eng, first clutch CL1, second clutch CL2, continuously variable transmission CVT) on the basis of the calculation result and transmits the command value to each controller 15, 16, 17, 18, 19.

The transmission controller 15 executes a shift control such as by controlling the hydraulic pressure to be supplied to the continuously variable transmission CVT such that a shift command from the integrated controller 14 is achieved.

The clutch controller 16 has sensor information from the second clutch input rotation speed sensor 6 and the second clutch output rotation speed sensor 7 input thereto, and controls a current of a solenoid valve by outputting a stroke amount command value to the first clutch CL1 and outputting a clutch hydraulic pressure command value to the second clutch CL2 to realize each clutch hydraulic pressure (current) command value. In this way, the clutch stroke amount of the first clutch CL1 is set and the pressing force of the second clutch CL2 is set. It should be noted that the clutch stroke amount of the first clutch CL1 is detected by the stroke position sensor 13.

The engine controller 17 inputs sensor information from the engine revolution speed sensor 11 and executes an engine torque control to achieve an engine torque command value from the integrated controller 14.

The motor controller 18 controls the motor/generator MG to achieve a motor torque command value and a motor rotation speed command value from the integrated controller 14.

The battery controller 19 manages a battery charge amount SOC of the battery 9 and transmits that information to the integrated controller 14.

It should be noted that each controller 14 to 19 is configured by a microcomputer including a central processing unit (CPU), a read-only memory (ROM), a random-access memory (RAM) and an input/output interface (I/O interface). Further, each controller 14 to 19 can be composed of a plurality of microcomputers.

Next, an output control of the motor/generator MG in the present embodiment is described.

Figure 2:
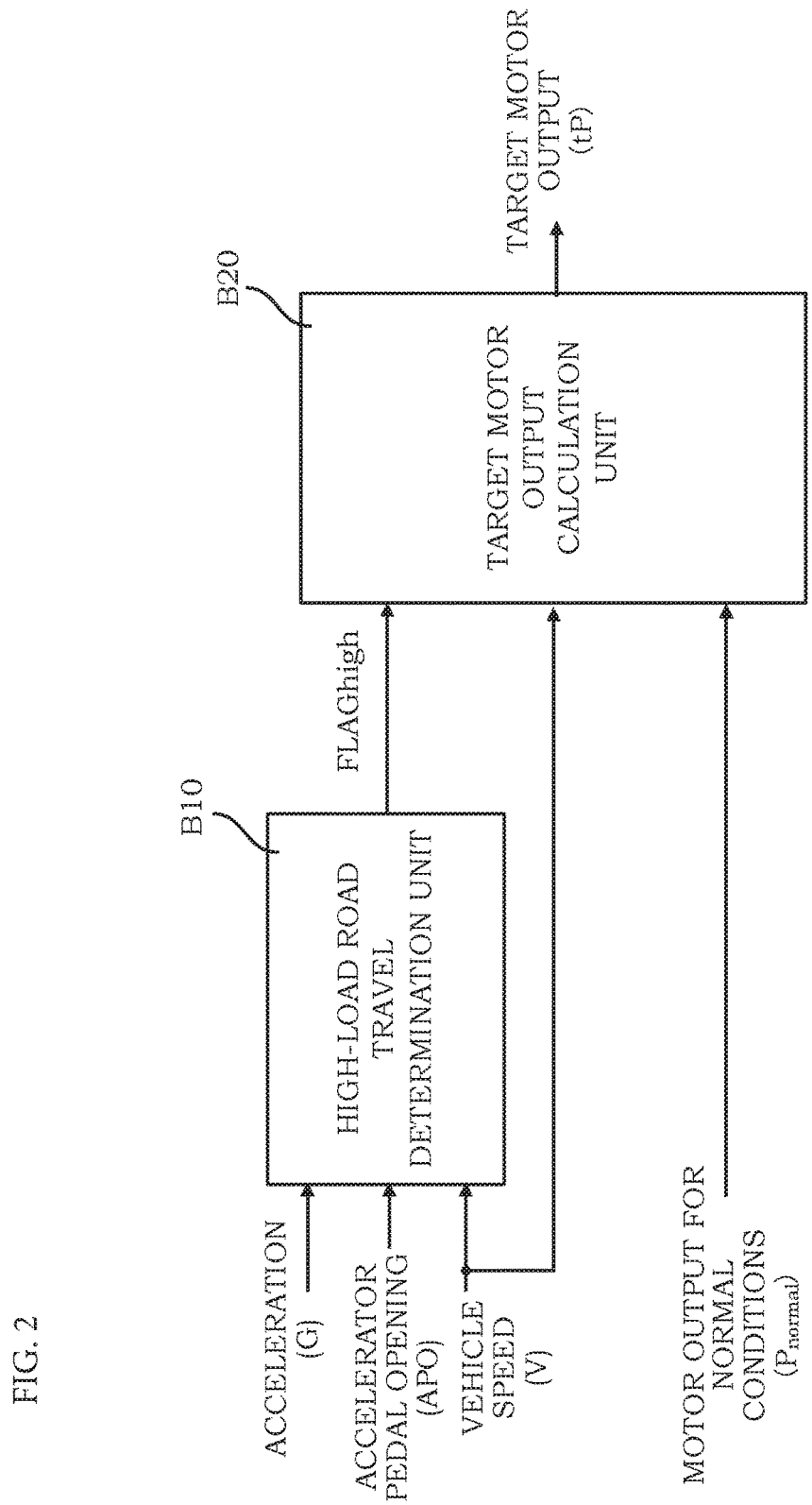
FIG. 2 is a block diagram showing the configuration of an output control unit of a motor/generator.

FIG. 2 is a block diagram showing the configuration of an output control unit for the motor/generator MG. It should be noted that each block shown in FIG. 2 is a virtual unit representing a function of the integrated controller 14 and does not signify physical presence.

The output control unit for the motor/generator MG is configured to include a high-load road travel determination unit B10 and a target motor output calculation unit (motor output setting unit) B20.

The high-load road travel determination unit B10 determines, on the basis of the acceleration G of the vehicle, an accelerator pedal opening APO and vehicle speed V, whether or not the vehicle is in a high-load road travel state, and outputs a high-load road travel request determination flag FLAGhigh to the target motor output calculation unit B20 when the vehicle is in the high-load road travel state. A specific determination method is described later.

The high-load road travel state mentioned here is a state where a predetermined vehicle acceleration cannot be obtained by the output of the engine Eng alone, e.g. a case where the vehicle is traveling in a place having a larger rolling resistance than pavement roads, such as traveling on sand. It should be noted that the state where the predetermined vehicle acceleration cannot be obtained includes a state where the vehicle cannot be accelerated It should be noted that the acceleration G may be calculated from the magnitude of change in the vehicle speed V or may be detected by a provided acceleration sensor.

The target motor output calculation unit B20 calculates a target motor output tP, which is the target output of the motor/generator MG, on the basis of the high-load road travel request determination flag FLAGhigh, the vehicle speed V and a target motor output tPnormal for normal conditions as described later.

The target motor output tPnormal for normal conditions is a target motor output set in a state other than the high-load road travel state and calculated by a method similar to the one in a known control for hybrid vehicles.

Figure 3:
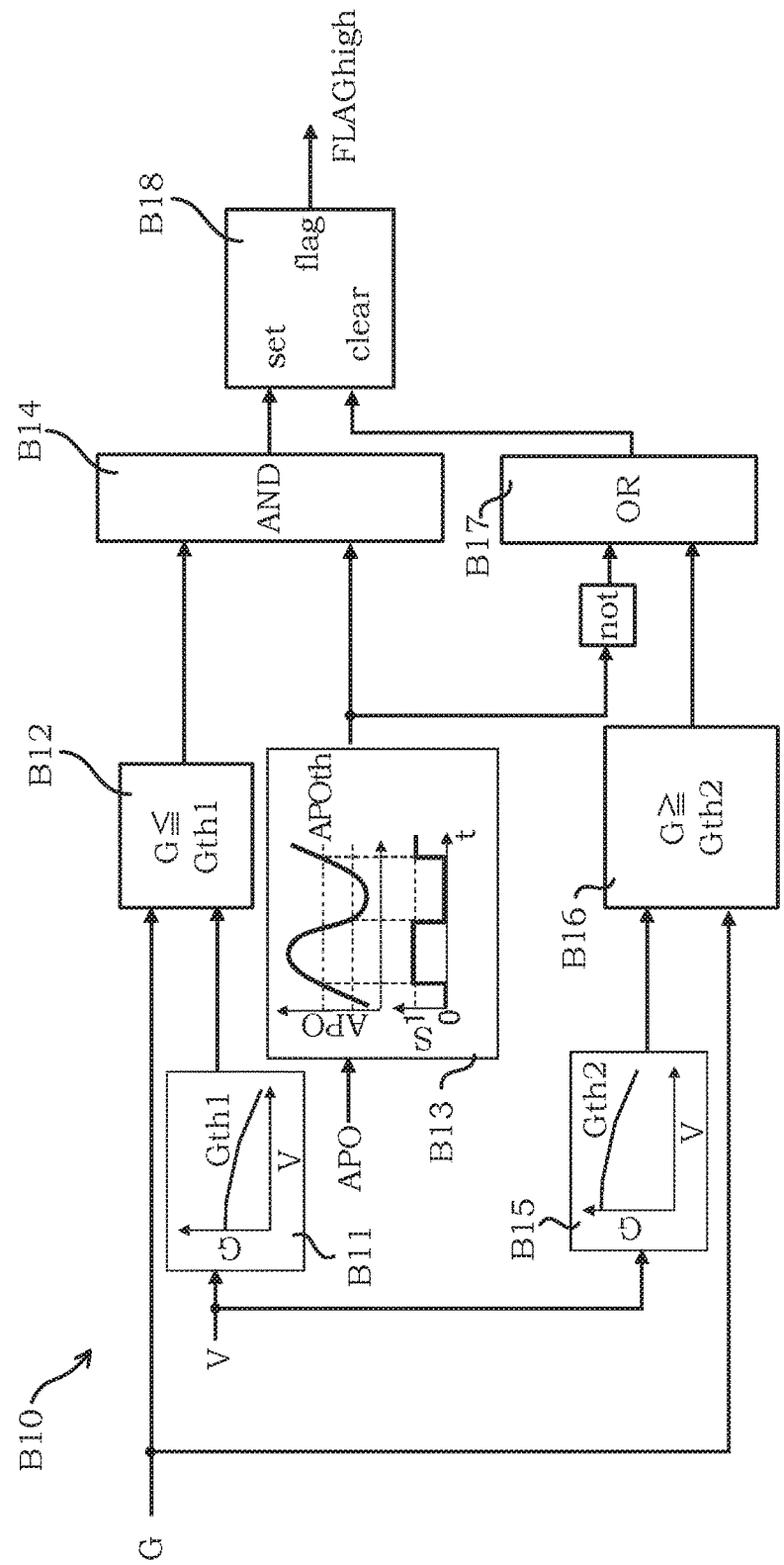
FIG. 3 is a block diagram showing the configuration of a high-load road travel determination unit.

FIG. 3 is a block diagram showing specific contents of high-load road travel determination made in the high-load road travel determination unit B10.

A first acceleration determination unit B11 calculates a first acceleration threshold value Gth1 by searching an acceleration threshold value table setting the first acceleration threshold value Gth1 for each vehicle speed with respect to the current vehicle speed V, and outputs the calculated first acceleration threshold value Gth1 to a first determination unit B12. The first acceleration threshold value Gth1 is an acceleration at which the vehicle can be determined to be traveling on a high-load road such as on sand, for example, when the accelerator pedal opening APO is set at an accelerator pedal opening threshold value APOth to be described later at the current vehicle speed V. In the acceleration threshold value table, the higher the vehicle speed, the smaller the first acceleration threshold value Gth1. This is based on a known characteristic of reducing the acceleration G as the vehicle speed increases due to control reasons and due to hardware reasons such as an engine and a transmission.

The first determination unit B12 determines whether or not the acceleration G is equal to or less than the first acceleration threshold value Gth1 and outputs a determination result to a second determination unit B14.

An accelerator pedal opening determination unit B13 determines whether or not the accelerator pedal opening APO is equal to or more than the accelerator pedal opening threshold value APOth and sets an output value S to 1, S=1, if the accelerator pedal opening APO is equal to or more than the accelerator pedal opening threshold value APOth, and sets the output value S to 0, S=0, if otherwise. The accelerator pedal opening threshold value APOth may be, for example, a value equivalent to fully open or a value equivalent to a large opening nearly fully open.

The output value S=1 is output to the second determination unit B14 if the accelerator pedal opening APO is equal to or more than the accelerator pedal opening threshold value APOth, whereas the output value S=0 is output to a fourth determination unit B17 if the accelerator pedal opening APO is less than the accelerator pedal opening threshold value APOth.

It should be noted that since the accelerator pedal opening finely varies depending on the condition of a road surface on which the vehicle is traveling, unintentional accelerator pedal operation from a driver and the like, there is a possibility that the determination result on the high-load road travel state is switched in a short cycle. In this case, the target motor output tP to be described later varies in a short cycle and a sense of discomfort is given to the driver. Accordingly, in the present embodiment, a hysteresis is provided for the accelerator pedal opening threshold value APOth so that, once the output value S=1 is set, the output value S=0 is not immediately set even if the accelerator pedal opening APO becomes smaller than the accelerator pedal opening threshold value APOth thereafter.

A second acceleration determination unit B15 calculates a second acceleration threshold value Gth2 from an acceleration threshold value table and the vehicle speed V similarly to the first acceleration determination unit B11 and outputs the second acceleration threshold value Gth2 to a third determination unit B16. In the acceleration threshold value table used in the second acceleration determination unit B15, the second acceleration threshold value Gth2 is also reduced as the vehicle speed V increases.

The second acceleration threshold value Gth2 is an acceleration assumed, for example, when the accelerator pedal opening APO is the accelerator pedal opening threshold value APOth at the current vehicle speed on a pavement road. Thus, if the vehicle speed is the same, the second acceleration threshold value Gth2 is larger than the first acceleration threshold value Gth1.

The third determination unit B16 determines whether or not the acceleration G is equal to or more than the second acceleration threshold value Gth2 and outputs a determination result to the fourth determination unit B17.

A flag setting unit B18 determines that the vehicle is in a high-load road travel state if the conditions that the acceleration G is equal to or less than the first acceleration threshold value Gth1 and S=1 are satisfied in the second determination unit B14, and sets the high-load road travel request determination flag FLAGhigh. On the other hand, the flag setting unit B18 determines that the vehicle is not in a high-load road travel state if any one of the conditions that the acceleration G is higher than the first acceleration threshold value Gth1, the acceleration G is equal to or more than the second acceleration threshold value Gth2, and S=0 are satisfied in the fourth determination unit B17. If the high-load road travel determination flag FLAGhigh is already set, this flag is cleared. It should be noted that once the high-load road travel request determination flag FLAGhigh is set, i.e. once FLAGhigh=1 is set, FLAGhigh=1 is kept until a clear condition is satisfied.

As described above, the high-load road travel determination unit B10 determines that the vehicle is in a high-load road travel state if the accelerator pedal opening APO is equal to or more than the accelerator pedal opening threshold value APOth and the acceleration G is equal to or less than the first acceleration threshold value Gth1. In this way, it can be accurately detected that the vehicle is traveling on a road surface having a larger rolling resistance than on a pavement road, e.g. traveling on sand or the like.

Figure 4:
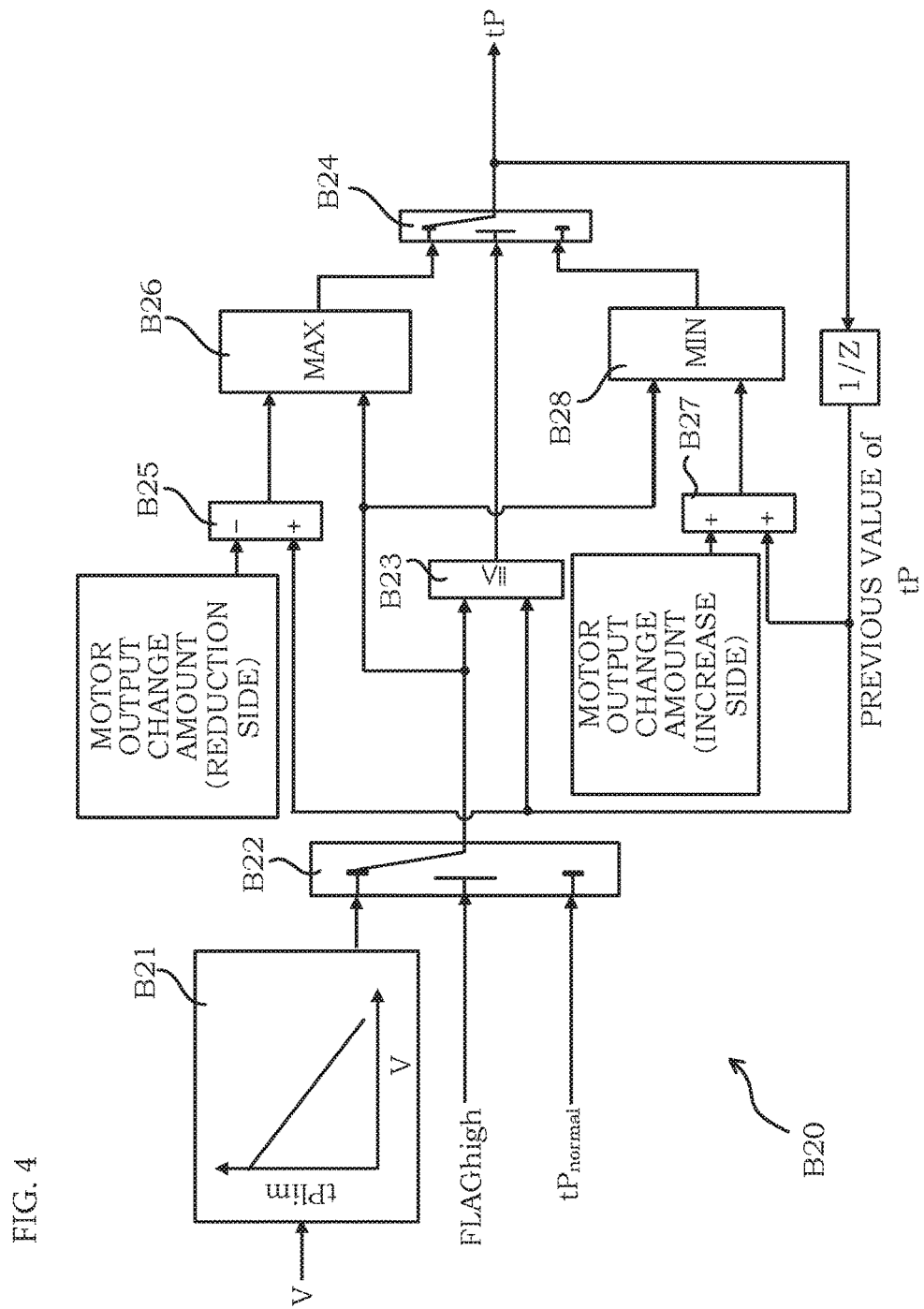
FIG. 4 is a block diagram showing the configuration of a motor output calculation unit.

FIG. 4 is a block diagram showing a specific calculation method of the target motor output tP performed in the target motor output calculation unit B20.

A target motor output calculation unit B21 calculates a target motor output tPlim for the high-load road travel state by searching a motor output map stored in advance with respect to the vehicle speed V.

The target motor output tPlim for the high-load road travel state is a motor output necessary for traveling at a constant speed at a target vehicle speed. Here, the target vehicle speed (hereinafter referred to as the target constant vehicle speed) is a vehicle speed lower than the target vehicle speed determined from the accelerator pedal opening and the like, i.e. a vehicle speed lower than the speed requested by the driver. Specifically, the target vehicle speed is a vehicle speed at which a difference between a wide open throttle torque of the engine Eng and the motor output is smallest. This is described with reference to FIG. 5.

Figure 5:
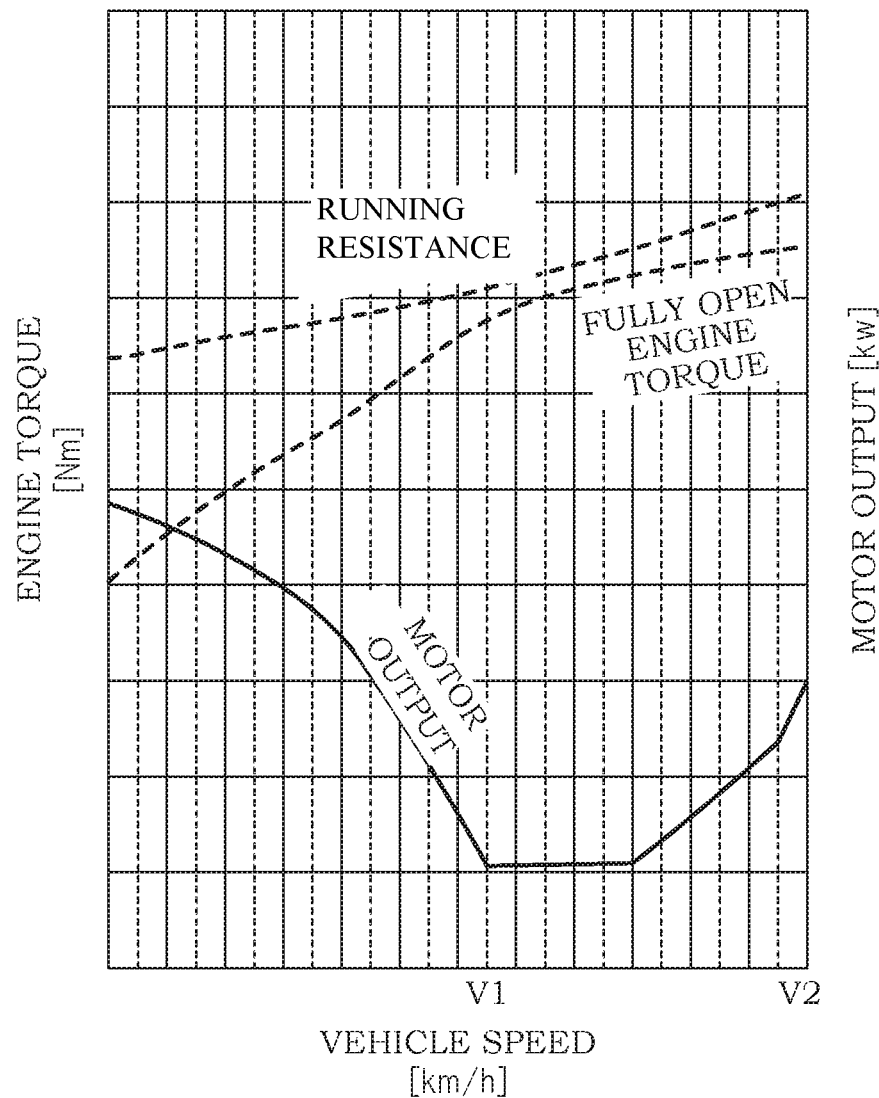
FIG. 5 is a graph showing a relationship of an engine torque, a motor output and a rolling resistance.

FIG. 5 is a graph showing the relationship between the torque of the engine Eng, the motor output, the vehicle speed and the rolling resistance in the high-load road travel state. It should be noted that since the required vehicle speed is lower in the high-load road travel state than when traveling on a pavement road, a vehicle speed V2 of FIG. 5 is a medium speed (e.g. about 40 km/h).

To travel at a constant vehicle speed when the rolling resistance is larger than the wide open throttle torque, the difference between the rolling resistance and the wide open throttle torque may be compensated for by the motor output.

The wide open throttle torque generally has a convex upward profile in a range including a high-speed region not shown in FIG. 5. In FIG. 5, the difference between the fully open engine torque and the rolling resistance is smallest at a vehicle speed V1. That is, the motor output necessary for traveling at a constant speed is smallest at the vehicle speed V1. In other words, if the vehicle travels at the constant vehicle speed V1, the amount of power consumption in the motor/generator MG is minimized and the motor/generator MG can be driven for a longer time. It should be noted that the vehicle speed V1 is a low speed (e.g. about 20 km/h).

Accordingly, the target motor output tPlim calculated in the target motor output calculation unit B21 has such a magnitude that acceleration is possible up to the vehicle speed V1 if the vehicle speed V is lower than the vehicle speed V1 and the vehicle can travel at the constant vehicle speed V1 upon reaching the vehicle speed V1.

FIG. 4 is described again.

A first switch unit B22 selects the target motor output tPlim for the high-load road travel state if the vehicle is in the high-load road travel state, and selects the target motor output tPnormal for normal conditions if the vehicle is not in the high-load road travel state. The selected motor output is output to a determination unit B23, a MAX selection unit B26 and a MIN selection unit B28.

The previous value of the target motor output tP is also loaded into the determination unit B23, which determines whether or not the motor output selected in the first switch unit B22 is equal to or less than the previous value of the target motor output tP.

Further, the previous value of the target motor output tP is also loaded into a reduction-side limit value calculation unit B25 and an increase-side limit value calculation unit B27.

The reduction-side limit value calculation unit B25 outputs a reduction-side limit value, obtained by subtracting the reduction-side motor output change amount set in advance from the previous value of the target motor output tP, to the MAX selection unit B26. The reduction-side motor output change amount is such a motor output reduction amount as to suppress a reduction in vehicle speed accompanying a reduction in the motor output to an extent not to give a sense of discomfort to the driver, and is set by adapting to each vehicle type to which the present embodiment is applied.

The increase-side limit value calculation unit B27 outputs an increase-side limit value obtained by adding the increase-side motor output change amount set in advance to the previous value of the target motor output tP, to the MIN selection unit B28. The increase-side motor output change amount is such a motor output increase amount as to suppress an increase in vehicle speed accompanying an increase in the motor output to an extent not to give a sense of discomfort to the driver, and is set by adapting to each vehicle type to which the present embodiment is applied.

The MAX selection unit B26 compares the motor output selected in the first switch unit B22 and the reduction-side limit value and selects the larger one.

The MIN selection unit B28 compares the motor output selected in the first switch unit B22 and the increase-side limit value and selects the smaller one.

A second switch unit B24 sets the motor output selected in the MAX selection unit B26 or the MIN selection unit B28 as the target motor output tP according to the determination result of the determination unit B23. Specifically, the motor output selected in the MAX selection unit B26 is set as the target motor output tP if the motor output selected in the first switch unit B22 is equal to or less than the previous value of the target motor output tP, whereas the motor output selected in the MIN selection unit B28 is set as the target motor output tP if otherwise.

In setting the target motor output tP, the motor output selected in the first switch unit B22 may be directly set as the target motor output tP. However, since a sense of discomfort is given to the driver if a sudden change in vehicle speed or the like occurs by changing the motor output, the increase-side and reduction-side change amounts are limited to prevent this as described above in the present embodiment.

Figure 6:
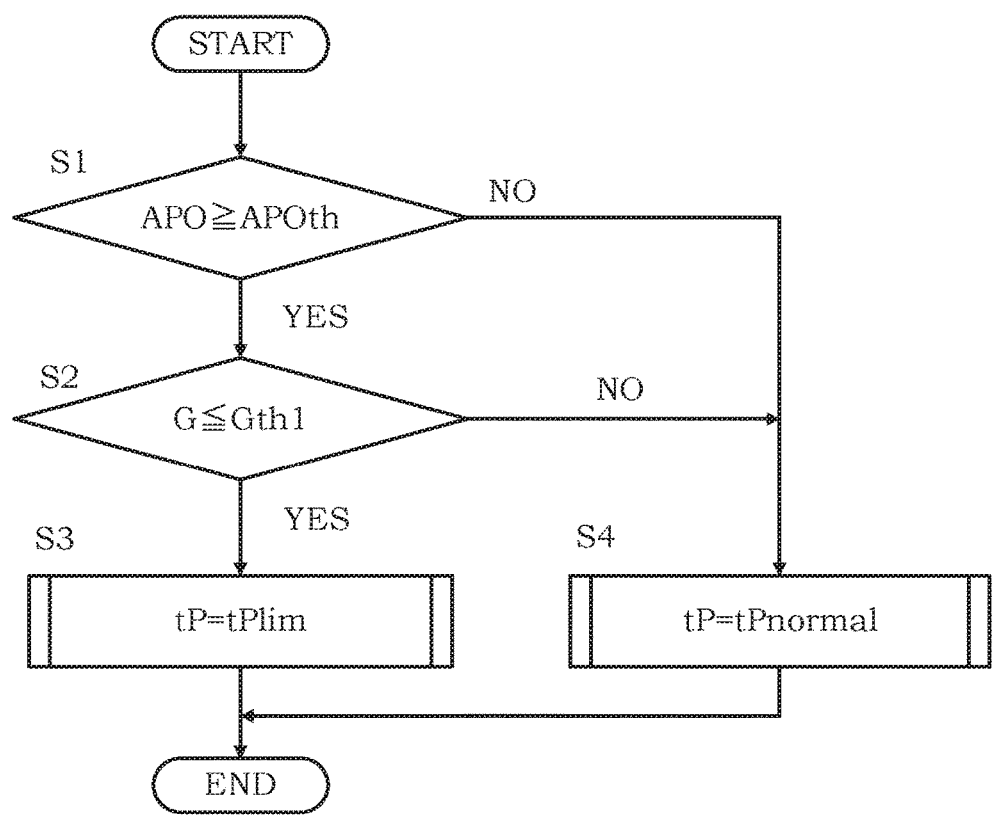
FIG. 6 is a flowchart showing a control routine of the motor/generator.

FIG. 6 is a flowchart of a control routine of the motor/generator MG described above. This routine is repeatedly executed at short intervals of, e.g. several milliseconds.

This routine is described in accordance with the Steps below.

In Step S1, the integrated controller 14 determines whether or not the accelerator pedal opening APO is equal to or more than the accelerator pedal opening threshold value APOth and performs processing of Step S2 if the determination result is in the affirmative while performing processing of Step S4 if the determination result is in the negative.

In Step S2, the integrated controller 14 performs determination on the acceleration G and performs processing of Step S3 if the acceleration G is equal to or less than the first acceleration threshold value Gth1 while performing processing of Step S4 if the acceleration G is equal to or more than the second acceleration threshold value Gth2.

In Step S3, the integrated controller 14 sets the target motor output tPlim for the high-load road travel state as the target motor output tP and controls the motor/generator MG.

In Step S4, the integrated controller 14 sets the target motor output tPnormal for normal conditions as the target motor output tP and controls the motor/generator MG. Specific control contents are not described since they are the same as those of a known motor control for hybrid vehicles.

Figure 7:
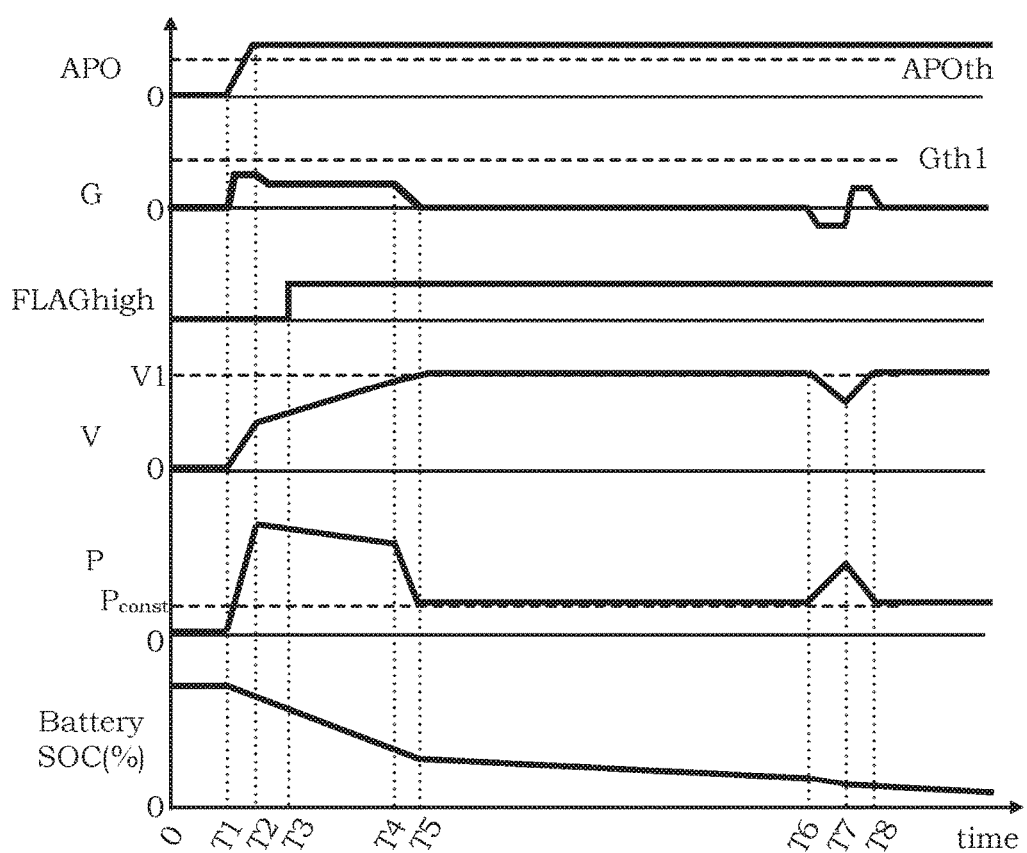
FIG. 7 is a timing chart in the case of executing the control routine of FIG. 6.

FIG. 7 is a timing chart for when the control routine of FIG. 6 is executed when the vehicle travels on sand having a large rolling resistance.

When the driver starts depressing the accelerator pedal at timing T1 when the vehicle is stopped, the vehicle starts traveling while being assisted by the motor/generator MG.

However, since the rolling resistance is large, the acceleration G stops increasing before timing T2 is reached, and becomes a value smaller than the first acceleration threshold value Gth1. Associated with this, the vehicle speed V also dully increases after timing T2. In this stage, the target output tP of the motor/generator MG is the target motor output tPnormal for normal conditions.

At timing T3, the conditions for determining that the vehicle is in the high-load road travel state, where the accelerator pedal opening APO is equal to or more than the accelerator pedal opening threshold value APOth and the acceleration V is equal to or less than the first acceleration threshold value Gth1, are satisfied. Thus, the high-load road travel determination flag FLAGhigh is set. In this way, the target output tP of the motor/generator MG is switched to the target motor output tPlim for the high-load road travel state.

It should be noted that there is a time lag until it is determined at timing T3 that the vehicle is in the high-load road travel state after the conditions for determining that the vehicle is in the high-load road travel state are satisfied at timing T2 because the first determination is made at timing T3. As just described, in the present embodiment, the control routine of FIG. 6 is started at timing T3 reached after a state where the accelerator pedal opening APO being larger than the accelerator pedal opening threshold value APOth is kept for a predetermined time. The control routine is not started immediately after the accelerator pedal is depressed because accurate determination cannot be made immediately after the accelerator pedal is depressed. Specifically, even on sand or the like, if the road surface below the wheels is treaded down while the vehicle is stopped, there is a possibility that a high acceleration G is obtained immediately after the vehicle starts moving. Accordingly, the control routine of FIG. 6 is started after the influence of the treaded down road surface is eliminated, e.g. upon the elapse of about 2 seconds after the accelerator pedal is depressed.

The vehicle continues to accelerate even after it is determined at timing T3 that the vehicle is in the high-load road travel state, and the output of the motor/generator MG is limited to Pconst for traveling at a constant speed at the vehicle speed V1 when the vehicle speed V reaches V1 at timing T5. At this time, in order to prevent a sense of discomfort from being given to the driver due to a sudden change in the acceleration G or the like, a change of the target motor output tP is limited as described with reference to FIG. 4 and the target motor output tP is gradually reduced from timing T4 at which the vehicle speed V approaches V1.

The target motor output tP is limited, and increased to return the vehicle speed V to V1 if the vehicle speed V starts decreasing due to factors such as a further increase of the rolling resistance at timing T6 when the vehicle is initially traveling at the vehicle speed V1. In this way, the vehicle speed V returns to V1 and the target motor output tP returns to Pconst at timing T8.

As described above, the integrated controller 14 controls the target motor output tP to achieve the vehicle speed V1 at which the output of the motor/generator MG necessary for traveling at a constant speed is smallest if the vehicle is determined to be in the high-load road travel state. In this way, as is clear also from FIG. 7, a reduction rate of the battery charge amount (SOC) becomes slower as compared to that before timing T5 during a period between timings T5 and T6 during which the target output tP of the motor/generator MG is limited.

Next, effects of the present embodiment are described.

In the present embodiment, the integrated controller 14 limits the output of the motor/generator MG when the vehicle speed V reaches the vehicle speed V1 after determining that the vehicle is traveling on a high-load road surface on which the predetermined vehicle acceleration cannot be obtained by the output of the engine Eng alone. Since the reduction rate of the battery charge amount is suppressed in this way, a travelable time in the HEV mode or the like can be made longer.

By limiting the output of the motor/generator MG, it becomes impossible to satisfy the required vehicle speed determined from the accelerator pedal opening. However, in the high-load road travel state such as in the case of traveling on a high rolling resistance road surface such as on sand, the amount assistance by the motor/generator MG necessary to satisfy the required vehicle speed increases and spurs a reduction of the battery charge amount. Accordingly, a longer travelable time in the HEV mode or the like is prioritized over the satisfaction of the required vehicle speed.

In the present embodiment, since the integrated controller 14 limits the output of the motor/generator MG to maintain the vehicle speed V1, the amount of power consumption can be reduced as compared to the case where the vehicle continues to accelerate, and the power consumption of the motor/generator MG in the HEV mode or the like can be suppressed.

In the present embodiment, the integrated controller 14 increases the output of the motor/generator MG to return the vehicle speed V to the vehicle speed V1 when the vehicle speed V decreases during the output control of the motor/generator MG. If the rolling resistance further increases and the vehicle speed decreases during traveling at the vehicle speed V1 as described above, the vehicle speed continues to decrease and the vehicle eventually stops if the output of the motor/generator MG is kept limited. On the other hand, if the output of the motor/generator MG is controlled to maintain a vehicle speed lower than the vehicle speed V1, the output of the motor/generator MG necessary for traveling at a constant speed increases as shown in FIG. 5 and spurs a reduction of the battery charge amount. Accordingly, by increasing the output of the motor/generator MG to return the vehicle to the vehicle speed V1, a continued decrease of the vehicle speed is prevented and a reduction of the battery charge amount is suppressed.

In the present embodiment, the integrated controller 14 limits an output change rate in the case of changing the output of the motor/generator MG. In this way, it is possible to prevent a sense of discomfort from being given to the driver due to a sudden change in acceleration, change in vehicle speed or the like when the motor output is limited.

In the present embodiment, since the integrated controller 14 determines, according to the accelerator pedal opening APO and the acceleration G, whether or not the vehicle is in the high-load road travel state, whether or not the vehicle is in the high-load road travel state can be accurately determined.

In the present embodiment, the vehicle speed V1 at which the output of the motor/generator MG necessary for traveling at a constant speed in the high-load road travel state is smallest is set as the vehicle speed V maintained in the high-load road travel state. In this way, the travelable time can be made longer by suppressing a reduction of the battery charge amount in the case of traveling in the HEV mode or the like in the high-load road travel state.

Figure 8:
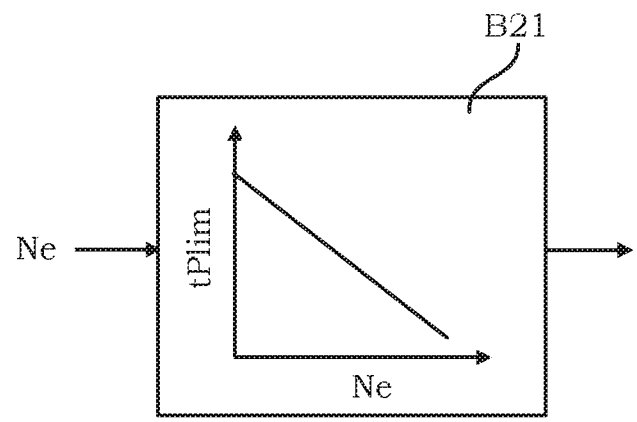
FIG. 8 is a diagram showing another example of a target motor output calculation unit.
Figure 9:
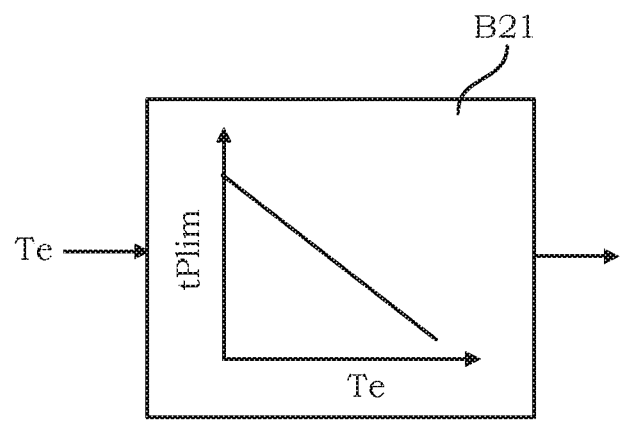
FIG. 9 is a diagram showing still another example of the target motor output calculation unit.

It should be noted that although the target motor output tPlim for the high-load road travel state is calculated on the basis of the vehicle speed V in the target motor output calculation unit B21 of FIG. 4, the target motor output tPlim can also be calculated on the basis of estimated engine torque or engine revolution speed as shown in FIGS. 8 and 9 instead of the vehicle speed V as described below.

In the present embodiment, it is aimed to make the continuous travelable time in the HEV mode or the like (hereinafter, also merely referred to as a "continuous travelable time") longer by suppressing a reduction of the battery charge amount in a high-load road travel state such as in the case of traveling on a high rolling resistance road surface on which a predetermined vehicle acceleration cannot be obtained by the output (torque) of the engine Eng alone. Accordingly, the motor output for traveling at a constant speed in the high-load road travel state (i.e. motor output equivalent to (rolling resistance−engine torque)) is calculated from the engine torque and, if a sufficient continuous travelable time cannot be ensured by that motor output, the motor output is temporarily increased to increase the engine torque. That is, by being assisted by the motor/generator MG, the engine revolution speed and the vehicle speed are increased to increase the engine torque. After the engine torque is increased, the motor output may be limited to ensure a sufficient continuous travelable time.

In other words, the target motor output tPlim for the high-load road travel state can be calculated on the basis of the estimated engine torque estimated from the accelerator pedal opening APO and the engine revolution speed. Further, the target motor output tPlim for the high-load road travel state may be calculated on the basis of the engine revolution speed used for the calculation of the estimated engine torque.

Although an embodiment of the present invention has been described above, the above embodiment is merely an illustration of one application example of the present invention and is not intended to limit the technical scope of the present invention to the specific configuration of the above embodiment.

The invention claimed is:

1. A hybrid vehicle control method for controlling a hybrid vehicle with an engine and an electric motor as the drive sources of the vehicle, comprising:
    setting a threshold value an of accelerator pedal actuation based on a speed at which the vehicle is traveling;
    determining, by a controller, that the vehicle is traveling on a high rolling resistance road surface when an actual vehicle acceleration obtained when the accelerator pedal actuation is set to the threshold value or larger is less than a requested vehicle acceleration using an output of the engine alone;
    determining that the vehicle is traveling on a paved road when the requested vehicle acceleration is obtained; and
    limiting, by the controller, an output of the electric motor when a vehicle speed reaches a vehicle speed lower than a requested vehicle speed when the vehicle is determined to be traveling on the high rolling resistance road surface.

2. A hybrid vehicle control method for controlling a hybrid vehicle with an engine and an electric motor as the drive sources of the vehicle, comprising:
    determining, by a controller, that the vehicle is traveling on a high rolling resistance road surface having a rolling resistance that cannot be overcome using an output of the engine at a wide open throttle torque when a requested vehicle speed cannot be obtained using the output of the engine at the wide open throttle torque; and
    limiting, by the controller, an output of the electric motor when a vehicle speed reaches a vehicle speed lower than the requested vehicle speed during traveling on the high rolling resistance road surface.

3. The hybrid vehicle control method according to claim 1, further comprising maintaining the vehicle speed that is lower than the requested vehicle speed.

4. The hybrid vehicle control method according to claim 3, further comprising, increasing the output of the electric motor to return the vehicle speed to the vehicle speed that is lower than the requested vehicle speed if the vehicle speed decreases while the output of the electric motor is limited.

5. The hybrid vehicle control method according to claim 1, further comprising, limiting a rate of change of an output of the electric motor.

6. The hybrid vehicle control method according to claim 1, wherein:
    the vehicle speed that is lower than the requested vehicle speed is a vehicle speed at which the output of the electric motor is the minimum output necessary for traveling at a constant speed on a high rolling resistance road surface.

7. A hybrid vehicle control method for controlling a hybrid vehicle with an engine and an electric motor as drive sources of the vehicle, comprising:
    setting a threshold value of an accelerator pedal actuation based on a speed of the vehicle;
    determining, by a controller, that the vehicle is traveling on a high rolling resistance road surface when a requested vehicle acceleration cannot be obtained even if an accelerator pedal is set at the threshold value or larger;
    determining that the vehicle is traveling on a paved road when the requested vehicle acceleration is obtained; and
    limiting, by the controller, an output of the electric motor when a vehicle speed reaches a predetermined vehicle speed lower than a requested vehicle speed when traveling on the high rolling resistance road surface.

8. A hybrid vehicle control method for controlling a hybrid vehicle with an engine and an electric motor as drive sources of the vehicle, comprising:
    determining, by a controller, that the vehicle is traveling on a high rolling resistance road surface when a requested vehicle speed cannot be obtained using an output of the engine at a wide open throttle torque; and
    limiting, by the controller, an output of the electric motor when a vehicle speed reaches a predetermined vehicle speed lower than the requested vehicle speed when traveling on the high rolling resistance road surface.

* * * * *